(12) United States Patent
Bell et al.

(10) Patent No.: US 8,765,885 B2
(45) Date of Patent: Jul. 1, 2014

(54) APPARATUS AND PROCESS FOR THE POLYMERISATION OF OLEFINS

(75) Inventors: Andrew David Bell, Carry-le-Rouet (FR); Kevin Peter Ramsay, West Lothian (GB)

(73) Assignee: Ineos Sales (UK) Limited, Hampshire (GB)

( * ) Notice: Subject to any disclaimer, the term of this patent is extended or adjusted under 35 U.S.C. 154(b) by 0 days.

(21) Appl. No.: 13/885,574

(22) PCT Filed: Nov. 29, 2011

(86) PCT No.: PCT/EP2011/071299
§ 371 (c)(1),
(2), (4) Date: May 15, 2013

(87) PCT Pub. No.: WO2012/072639
PCT Pub. Date: Jun. 7, 2012

(65) Prior Publication Data
US 2013/0331535 A1 Dec. 12, 2013

(30) Foreign Application Priority Data

Nov. 29, 2010 (EP) .................................. 10192943

(51) Int. Cl.
| | |
|---|---|
| *C08F 2/34* | (2006.01) |
| *C08F 2/02* | (2006.01) |
| *B01J 19/24* | (2006.01) |
| *B01J 8/38* | (2006.01) |
| *C08F 10/00* | (2006.01) |
| *B01J 8/00* | (2006.01) |
| *C08F 210/16* | (2006.01) |
| *C08F 110/06* | (2006.01) |
| *C08F 110/02* | (2006.01) |

(52) U.S. Cl.
CPC ...... *B01J 8/0045* (2013.01); *B01J 2208/00761* (2013.01); *B01J 8/388* (2013.01); *C08F 10/00* (2013.01); *C08F 210/16* (2013.01); *B01J 2208/00769* (2013.01); *C08F 110/06* (2013.01); *B01J 2208/00274* (2013.01); *C08F 110/02* (2013.01); *B01J 8/0055* (2013.01); *B01J 8/0015* (2013.01); *Y10S 526/92* (2013.01)
USPC .................. 526/68; 526/67; 526/88; 526/920; 528/502 D; 422/131; 422/613

(58) Field of Classification Search
USPC ........ 422/132, 144, 131, 613; 526/67, 68, 88, 526/901, 920; 528/502 D
See application file for complete search history.

(56) References Cited

U.S. PATENT DOCUMENTS 3,002,963 A * 10/1961 Czenkusch et al. ........... 526/106
4,543,399 A     9/1985 Jenkins, III et al.
(Continued)

FOREIGN PATENT DOCUMENTS

EP    0 089 691 A2    9/1983
EP    0 696 293        11/1994
(Continued)

*Primary Examiner* — Fred M Teskin
(74) *Attorney, Agent, or Firm* — Nixon & Vanderhye, P.C.

(57) ABSTRACT

Apparatus and process for gas phase polymerisation of olefins. The apparatus includes (a) a reaction zone having a grid at its base, (b) an inlet located in the lower half of the reaction zone for introducing a reaction gas to the reaction zone, (c) an outlet located in the upper half of the reaction zone for removing the reaction gas from the reaction zone, and (d) a solids separation unit having an inlet fluidly connected to the outlet for removing the reaction gas from the reaction zone. The inlet of the solids separation unit is located at a vertical height lower than the outlet for removal of reaction gas from the reaction zone and such that the angle to the horizontal of a straight line drawn between the inlet of the solids separation unit and the outlet for removal of reaction gas from the reaction zone is greater than 20°.

20 Claims, 1 Drawing Sheet

(56) References Cited

U.S. PATENT DOCUMENTS

| | | |
|---|---|---|
| 4,588,790 A | 5/1986 | Jenkins, III et al. |
| 4,640,963 A | 2/1987 | Kreider et al. |
| 4,882,400 A | 11/1989 | Dumain et al. |
| 5,382,638 A | 1/1995 | Bontemps et al. |
| 5,405,922 A | 4/1995 | DeChellis et al. |
| 5,541,270 A | 7/1996 | Chinh et al. |
| 2001/0018500 A1 | 8/2001 | Marissal et al. |
| 2008/0021178 A1 | 1/2008 | Scott et al. |

FOREIGN PATENT DOCUMENTS

| | | |
|---|---|---|
| EP | 0 699 213 | 12/1994 |
| EP | 1 487 588 | 10/2003 |
| GB | 1 413 613 | 11/1975 |
| JP | 59 176305 A | 10/1984 |
| WO | WO 94/25497 A1 | 11/1994 |
| WO | WO 94/28032 A1 | 12/1994 |
| WO | WO 03/080253 A1 | 10/2003 |
| WO | WO 2006/050919 A1 | 5/2006 |
| WO | WO 2010/049619 A1 | 5/2010 |

* cited by examiner

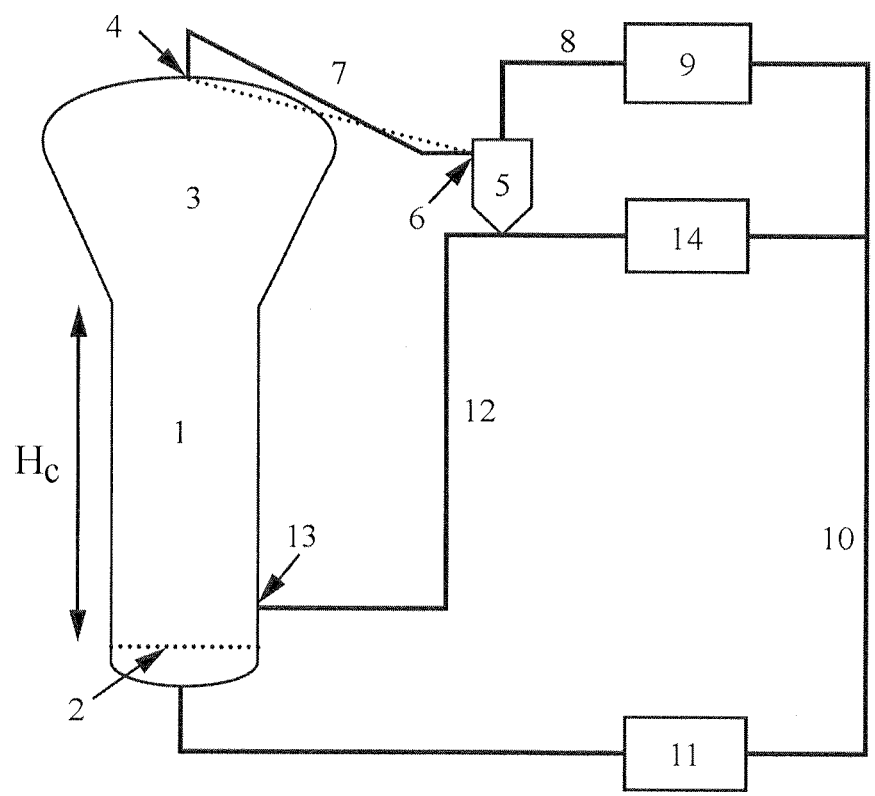

APPARATUS AND PROCESS FOR THE POLYMERISATION OF OLEFINS

This application is the U.S. national phase of International Application No. PCT/EP2011/071299 filed 29 Nov. 2011 which designated the U.S. and claims priority to European Patent Application No. 10192943.8 filed 29 Nov. 2010, the entire contents of each of which are hereby incorporated by reference.

The present invention relates to an apparatus and process for gas phase polymerisation of olefins.

BACKGROUND OF THE INVENTION

The polymerisation of olefins in the gas phase in fluidised or similar reactors is well-known and commercially operated. In a typical fluidised bed process for the production of polyethylene, for example, a bed of growing polymer particles is maintained in a fluidised state in a vertically orientated cylindrical reactor by means of an ascending gas stream (fluidising gas). Gas exiting the top of the fluidised bed reactor is cooled and recycled to the base via a recycle loop. Fresh monomer(s) are added to replace those consumed in the reaction whilst produced polymer particles are continuously removed from the bed.

GB 1,413,613, for example, describes a process for the dry polymerisation of olefins in a fluidised bed reactor. Two possible configurations are described to address the potential problem of small solid particles, known as "fines", being entrained from the reactor with the ascending gas stream. The first of these is the use of what is referred to in GB 1,413,613 as a "tranquilisation chamber" which is an area of larger cross-section compared to the reactor and provided above the reactor which acts to reduce the velocity of the fluidising gas, allowing solid particles which might otherwise exit the top of the fluidised bed to fall back to the bed. The second is the use of a cyclone to separate the entrained solids for subsequent return to the reactor.

Of the two options disclosed in GB 1,413,613, that referred to as the tranquilisation chamber, which may alternatively be, and, in fact, is more generally, referred to as a disengagement zone or velocity reduction zone, has become the commonly used means for reducing entrainment from fluidised bed reactors. However, despite the use of a disengagement zone, it is common for significant quantities of solids to remain entrained in the fluidising gas exiting the disengagement zone. Such solids may foul components of the line through which the fluidising gas is recycled, which can lead to a requirement for shut-down and cleaning. To reduce this problem it is therefore known to also use a cyclone in addition to the disengagement zone to separate entrained solids from the fluidising gas exiting the disengagement zone. Such processes are described, for example, in U.S. Pat. Nos. 4,882,400 and 5,382,638.

U.S. Pat. No. 4,882,400, for example, discloses an apparatus for the gas phase polymerisation of olefins in a fluidised bed reactor comprising a disengagement chamber and a cyclone which acts to separate entrained solids from the fluidising gas exiting the reactor, for recycle to the fluidised bed.

U.S. Pat. No. 5,382,638 also discloses an apparatus for the gas phase polymerisation of olefins in a fluidised bed reactor comprising a disengagement chamber and a cyclone which acts to separate entrained solids from the fluidising gas exiting the reactor, for recycle to the fluidised bed.

Cyclones are also known for essentially the same purpose for vapour phase polymerisation of propylene in horizontal gas phase reactors, for example as described in U.S. Pat. No. 4,640,963.

In general reaction (e.g. fluidising) gas passes through and exits the top of the reaction zone and is passed to a cyclone or other solids separation unit, wherein entrained solids are separated from the gas, usually for return to the reaction zone. In general the gas exits the reaction zone via a length of vertically orientated pipe at the top of the reaction zone and enters the cyclone, which is itself vertically orientated, at or near the top of the cyclone via a length of horizontally orientated pipe. Thus, the simplest connection is obtained by simply connecting the vertically orientated pipe to a length of horizontally orientated pipe which passes the gas directly to the cyclone. Further, a relatively high location for the cyclone has been considered advantageous in minimising back-pressure and providing a gravitational driving force for reinjection of the fines into the reactor. In particular, if it were just a case of "ease" of reinjection into the reaction zone, the solids would be reinjected above the fluidised bed. However, from a process point of view this can lead to direct re-entrainment of significant quantities of the reinjected solids. It is thus desirable to reinject the solids back into the fluidised bed itself, although this requires injection into a zone of higher pressure and hence requires a larger "driving force".

Consistent with this, in the prior art documents mentioned above the inlet of the cyclone is shown located above the vertical height of the reactor outlet.

SUMMARY OF THE INVENTION

It has now been found that, although it generally requires an increase in length of the connecting pipework to the cyclone (and in associated pressure drop), a polymerisation process using a cyclone may be advantageously operated by locating the cyclone inlet at a vertical height lower than the vertical height of the outlet for removal of gas from the reaction zone.

Thus, in a first aspect, the present invention provides an apparatus for the gas phase polymerisation of olefins, said apparatus comprising:

a) a reaction zone comprising a grid at its base.

b) an inlet located in the lower half of the reaction zone for introduction of a reaction gas to the reaction zone, c) an outlet located in the upper half of the reaction zone for removal of the reaction gas from the reaction zone, and d) a solids separation unit having an inlet fluidly connected to the outlet for removal of the reaction gas from the reaction zone, characterised in that the inlet of the solids separation unit is located at a vertical height lower than the outlet for removal of reaction gas from the reaction zone and such that the angle to the horizontal of a straight line drawn between the inlet of the solids separation unit and the outlet for removal of reaction gas from the reaction zone is greater than 20°.

The outlet for removal of the reaction gas from the reaction zone is located at a vertical height higher than the inlet for introduction of the reaction gas to the reaction zone. Thus, the reaction gas is passed in an overall upwards direction through the reaction zone.

The inlet for introduction of a reaction gas to the reaction zone is most preferably located at or close to the base of the reaction zone.

The reaction zone comprises a grid at its base, which effectively defines the base of the reaction zone. In use, the grid acts as the base of the bed of polymer particles and to support the polymer particles when not being maintained in the agitated state, for example if the gas flow through the grid is stopped.

Most preferably, the reaction gas is introduced to the reaction zone at the base of the reaction zone, and in particular through the grid i.e. the grid also acts as an "inlet located in the lower half of the reaction zone for introduction of a reaction gas to the reaction zone".

In contrast, the outlet for removal of the reaction gas from the reaction zone is in the upper half of the reaction zone, most preferably at or close to the top of the reaction zone. Most preferably the reaction zone comprises an expanded upper section which acts as and is usually referred to as) a disengagement zone, and the outlet for removal of the reaction gas from the reaction zone is located at or close to the top of this.

More than one inlet and/or more than one outlet may be provided in the apparatus. For example, reaction gas may be introduced to the reaction zone through the grid at the base of the reaction zone and a second inlet for introduction of reaction gas to the reaction zone may be located above the grid. According to the present invention the inlet of the solids separation unit is located at a vertical height lower than the outlet for removal of reaction gas from the reaction zone. A (nominal) straight line drawn between the inlet of the solids separation unit and the outlet for removal of reaction gas from the reaction zone makes an angle of greater than 20° to the horizontal with an overall downwards direction compared to the horizontal (as determined in the direction from the outlet for removal of reaction gas from the reaction zone to the inlet of the solids separation unit).

Preferably, the inlet of the solids separation unit is located relative to the outlet for removal of reaction gas from the reaction zone such that the angle to the horizontal of a straight line drawn between the two is greater than 30°, and most preferably greater than 45°.

For practical reasons the horizontal separation of the solids separation unit from the reactor is minimised.

It should be noted that the above relates to a nominal straight line drawn between the two points which represents the overall direction of travel. Thus, the outlet for removal of reaction gas from the reaction zone may, and in general will, still exit in a vertically orientated direction from the top of the reaction zone, such that reaction gas therein will be travelling upwards and vertically, as long as the overall direction between the outlet for removal of reaction gas from the reaction zone and the inlet of the solids separation unit is downwards as described.

The outlet for removal of reaction gas from the reaction zone and the inlet of the solids separation unit will generally be connected by pipework such that the reaction gas flows from one to the other. Preferably the pipework directly connects the outlet for removal of reaction gas from the reaction zone to the inlet of the solids separation unit with no other units, such as separation stages, in between. Similarly, preferably no obstructions, such as valves, are provided in the pipework. The pipework will comprise sections of different orientations which are joined together form a continuous path from the outlet for removal of reaction gas from the reaction zone to the inlet of the solids separation unit. Clearly, there will be at least one section of pipework located between the outlet for removal of reaction gas from the reaction zone and the inlet of the solids separation unit which does have an orientation below the vertical in order to give the overall orientation required. This section (or sections) may be of any orientation below the vertical greater than 0° and up to 90° (90° corresponding to a vertical orientation) and which provides flow in a downwards direction. Preferably, the angle to the horizontal of such sections is greater than 25°, preferably greater than 35°, and most preferably greater than 50°.

The pipework may comprise sections of orientation angled between horizontal and vertical or may consist of vertical and horizontal sections connected together (by bends) to provide the overall connection.

Preferably, the length of any sections of the pipework between the outlet for removal of reaction gas from the reaction zone and the inlet of the solids separation unit which provide flow in an upward direction, including the section at the outlet of the reaction zone, which is generally vertically orientated and provides upward flow, is minimised, for example any such sections in total constituting less than 30% of the total length of pipework between the outlet for removal of reaction gas from the reaction zone and the inlet of the solids separation unit, more preferably less than 15% of the total length. Preferably, other than the initial length at the outlet of the reaction zone, no lengths of said pipework which provide flow in an upward direction are present. This avoids the presence of "low points" in the pipework which assists flow.

Preferably, the length of any horizontal sections of the pipework between the outlet for removal of reaction gas from the reaction zone and the inlet of the solids separation unit is minimised, for example such lengths constituting less than 50% of the total length of pipework between the outlet for removal of reaction gas from the reaction zone and the inlet of the solids separation unit, more preferably less than 25% of the total length.

Most preferably, at least 50% of the total length of pipework between the outlet for removal of reaction gas from the reaction zone and the inlet of the solids separation unit comprises sections which provide flow in a downward direction, such as at least 75% of the total length is in a downward direction.

In a further preferred aspect of the apparatus of the present invention, the vertical separation of the inlet of the solids separation unit from the inlet for introduction of reaction gas into the reaction zone is less than the vertical separation of the inlet of the solids separation unit from the outlet for removal of reaction gas from the reaction zone i.e. the inlet of the solids separation unit is located at a height generally corresponding to the lower half of the reaction zone.

In use the reaction zone will generally comprise a bed of polymer particles. In a preferred embodiment, the inlet of the solids separation unit is located at a height which is below the designed maximum height of the bed in the reaction zone. In general, bed height may be varied during operation for a particular product, or may be different for different polymer products, so whether a particular height is above or below the bed may depend on the reaction being performed. However, the physical reactor is of a fixed size and will have been designed to accommodate a maximum height of polymer bed in the reaction zone during reaction, this being the "designed maximum height" as used herein. (An example of the "designed maximum height" is the height $H_c$ of a cylindrical fluidised bed reactor described further below. Although the reactor can be operated with a fluidised bed height below this height, and sometimes even above it, the "designed maximum height" is a fixed height.)

The reaction zone preferably comprises at least one inlet for introduction of recycled solids to the reaction zone which is fluidly connected to a solids outlet of the solids separation unit.

The inlet(s) for introduction of recycled solids to the reaction zone may be located at any point in the reaction zone which enables the recycled solids to be introduced to the reaction zone i.e. above the grid. For example, the apparatus may comprise a compressor to provide sufficient motive force for the introduction regardless of the location of introduction. This compressor would typically be located on a motive gas line taken from the main reaction loop, the compressor being upstream of the solids outlet of the solids separation unit. Preferably the inlet(s) for introduction of recycled solids to the reaction zone are located in the lower half of the reaction zone, and most usually located so that in use the recycled solids are reintroduced into the bed of polymer particles.

Similarly, the inlet(s) for introduction of recycled solids to the reaction zone may be located at any suitable height relative to the solids outlet of the solids separation unit.

By locating the inlet of the solids separation unit at a vertical height lower than the outlet removal of reaction gas the overall flow of reaction gas and entrained solids is in a downwards direction.

Another advantage of the present invention is that it also allows the solids separation unit to be physically located at a lower height relative to the reaction zone. In a commercial scale reactor this can allow a significant reduction in the size of the support structure required for the solids separation unit. Solids separation units, such as cyclones, are sources of vibrations, which vibrations can affect the efficiency of the separation but can also cause vibrations in connected pipework and equipment. They thus require a support structure that prevents or minimises these vibrations. A particular advantage of the "lower" cyclone inlet relative to the reactor is that it becomes more practical to support the cyclone independently of the reactor support structure.

In general, the reaction zone of an apparatus for the gas phase polymerisation of olefins requires a significant support structure. For example, vertically orientated fluidised bed reactors can be of significant height (tens of meters) and weight, and require a very significant amount of support, usually in the form of a metal and concrete structure which surrounds large parts, if not all, of the reactor. In the past it has made sense to attach the cyclone to the top of this structure rather than have a separate support structure for the cyclone which must also be of the height of the reactor. However, with a common structure for the reactor and the cyclone, vibrations from the cyclone cause vibrations to the support around the reactor. In contrast, in the present invention it becomes possible to provide an independent support structure for the cyclone, the height of which is not dictated by the support structure for the reactor, and that vibrations in the cyclone can then be "contained" on the cyclone support structure and not passed to the reactor support structure.

Thus, in a second aspect, there is provided an apparatus for the gas phase polymerisation of olefins, said apparatus comprising:
 a) a reaction zone comprising a grid at its base,
 b) an inlet located in the lower half of the reaction zone for introduction of a reaction gas to the reaction zone,
 c) an outlet located in the upper half of the reaction zone for removal of the reaction gas from the reaction zone, and
 d) a solids separation unit having an inlet fluidly connected to the outlet removal of the reaction as from the reaction zone,
  characterised in that
  the reaction zone and the solids separation unit are supported by independent support structures.

The support structures are generally formed of metal and/or concrete, preferably being a metal framework supported on a concrete base for each of the cyclone and reactor. In the present invention the support structures are considered to be independent as long as they are separately attached to a base, even if they share a common base e.g. two separate metal frameworks may be attached to a common concrete base structure. A key feature which can be used to define whether structures are independent is whether vibrations in one can pass directly to the other, or whether such vibrations are contained within the first structure. Such can be readily determined, for example using modelling.

The preferred features of the second aspect are otherwise as for the preferred features of the apparatus of the first aspect as discussed herein. For example, in the second aspect the inlet of the solids separation unit is preferably located at a vertical height lower than the outlet for removal of reaction gas from the reaction zone and such that the angle to the horizontal of a straight line drawn between the inlet of the solids separation unit and the outlet for removal of reaction gas from the reaction zone is greater than 20°, as in the first aspect of the invention.

The apparatus of the present invention (first or second aspect) may be used for any polymerisation process in which bed of polymer particles are maintained in an "agitated state" in the reaction zone by the passage of the reaction gas through the reaction zone. By "agitated state", as used herein, is meant that the polymer particles move under influence of the reaction gas passing through the bed. It is a feature of such beds that they have an expanded volume compared to the bed "at rest" i.e. when no reaction gas or other agitation means is applied. Preferably the agitated bed volume is at least 10% greater than the volume of the bed "at rest". Typically the expanded volume is 10-30% greater than the volume of the bed "at rest". Particularly preferred examples of agitated states in the process of the present invention are fluidised and sub-fluidised regimes. The bed may, in addition to the reaction gas which passes through the bed, be agitated by further means, such as stirrers.

Preferably, the apparatus of the present invention is used for a process in which the bed of polymer particles is maintained in a fluidised state. The reaction gas in such processes passes through the grid and acts as a fluidising gas, and comprises olefin reactants and usually other components such as hydrogen and inert compounds, such as nitrogen as known in the art. Most preferably the bed is maintained in a fluidised state by the fluidising gas "alone", by which is meant without mechanical stirring or other means to agitate the bed.

In such an embodiment the reaction zone is preferably a vertically orientated reaction zone comprising a vertically orientated cylindrical section with a grid, known as a fluidisation grid, at its base and, above the vertically orientated cylindrical section, a section of expanded cross-section which acts as (and is usually referred to as) a disengagement zone. The cylindrical section has a height $H_c$ as measured from the fluidisation grid to the top of the cylindrical section. Reaction gas/fluidising gas is introduced into the reaction zone through the grid. At or close to the top of the section of expanded cross-section is located the outlet for removal of the fluidising gas from the reaction zone. Such reaction zones comprising a cylindrical "reactor" and a disengagement zone with an enlarged diameter are well-known in the art.

As noted above, one or more inlets for introduction of recycled solids to the reaction zone may be provided. In the apparatus of the present invention as applied to such reaction zones the one or more inlets for introduction of recycled solids to the reaction zone are preferably located at a height of between 0 and $0.5 \times H_c$ above the fluidisation grid. Preferably, the inlets are located at a height of more than $0.01 \times H_c$.

The solids separation unit in the apparatus according to the present invention may be any device for separating solids present in the reaction gas stream exiting the reaction zone.

Examples include an elbow concentrator device (e.g. pipe diverter), a filter or a cyclone. A cyclone is the preferred solids separation unit according to the present invention. An example of a suitable cyclone is that described in EP 1487588. The solids separation unit may consist of a single cyclone, or two or more cyclones, preferably in parallel. When multiple cyclones are used, each cyclone may optionally have its own dedicated feed line from the reactor.

As noted previously, the apparatus may also comprise a compressor. In use, the compressor can provide a motive gas to pass the separated solids, preferably continuously, from the solids outlet of the solids separation unit to the inlet for introduction of recycled solids to the reaction zone against the pressure therein. The motive gas may be any suitable gas but is preferably a fraction of cooled recycle gas in the process. The compressor is preferably located on a motive gas line upstream of where this is connected to the solids outlet of the solids separation unit.

The apparatus may also comprise an ejector located such that the separated solids may be passed to the reactor via said ejector, such as described in U.S. Pat. No. 4,882,400 or US 2008/021178.

The present invention also provides a process for the gas phase polymerisation of olefins, using an apparatus as described herein.

In a third aspect the present invention provides a process for the gas phase polymerisation of olefins in an apparatus according to either the first or the second aspect, and comprising:

a) providing a bed of polymer particles in said reaction zone, b) passing a reaction gas into the reaction zone through said inlet for introduction of said gas to the reaction zone, c) removing reaction gas from the reaction zone via said outlet for removal of the reaction gas from the reaction zone, and d) passing the removed reaction gas to a solids separation unit having an inlet fluidly connected to the outlet for removal of the fluidising gas from the reaction zone.

The process of the third aspect of the present invention is preferably a fluidised bed polymerisation process. For sake of simplicity, the present invention will hereinafter be generally described with respect to the preferred process for the gas phase polymerisation of olefins using a fluidised bed, but the description may equally be applied to other agitated beds within the scope of the present invention.

The process of the third aspect of the present invention preferably has a polymer production rate of at least 40 tonnes/hour. More preferably the production rate is at least 50 tonnes/hour, such as at least 75 tonnes/hour. There is no particular upper limit to the production rate in the process of the present invention, although the production rate would typically be less than 100 tonnes/hour. In fact, the present invention is particularly applicable to larger scale plants since it is in such plants that the largest mounting structures would otherwise be required for the solids separation unit and also where the vibration issues with cyclones can otherwise be most significant.

Generally at least 80% by weight of the entrained solids, such as at least 90% by weight, for example at least 98% by weight and even preferably 99% by weight of said solids are separated in the solids separation unit, e.g. in a cyclone. The nature of these solids depends on many factors such as e.g. the catalyst and the polymerisation conditions. Usually, the entrained solids are characterised by a particles size lower than 200 microns. The separated solids are usually returned to the bed in the reaction zone. The return of the separated solids can be done at one or several locations within the bed. In general, the use of one or two points of recycling is sufficient for operating reactor systems at production rates of 40 to 100 tonnes/hour.

Preferably, the process is a "condensed mode" polymerisation process, where at least a portion of the total feed introduced to the reactor is provided in the form of a liquid which vaporises inside the reaction zone. Condensed mode fluidised bed operation is described in, for example, EP 89691, U.S. Pat. Nos. 4,543,399, 4,588,790, EP 696293, U.S. Pat. No. 5,405,922, EP 699213 and U.S. Pat. No. 5,541,270.

In particular, the process according to the present invention preferably comprises cooling at least a portion of the fluidising gas exiting the solids separation unit such that at least a portion of the gases are condensed to form a liquid, which liquid is introduced into the reaction zone. The liquid introduced into the reaction zone vaporises within the reaction zone absorbing (and thereby "removing") heat generated by the exothermic polymerisation reaction. The liquid may be introduced into the base of or the lower quarter of the reaction zone, preferably above the fluidisation grid.

The condensed mode operation may be characterised by the amount of liquid introduced into the reaction zone relative to the total gas flow exiting the reaction zone. Thus, for example, a level of condensation of 10 wt % means that 10 wt % of the total gas flow rate exiting the reaction zone is reinjected in liquid form.

Preferably, the level of condensation is at least 10 wt %. More preferably, the level of condensation is at least 20 wt %, such as in the range 20 to 50 wt %.

The uncondensed gas and (condensed) liquid may be introduced into the fluidised bed in any suitable manner. For example, the mixture of uncondensed gas and liquid obtained from the cooling (condensation) step may be introduced into the reactor as a single stream. Alternatively, the mixture of uncondensed gas and liquid may be split into one or more streams and introduced into the reactor at different points. For example, one or more gaseous portions of the stream may be separated and introduced to the reactor below the fluidisation grid, whilst one or more portions which include the liquid may be introduced above the fluidisation grid, preferably in the lower quarter of the fluidised bed.

Preferably at least 20 wt % by weight, preferably at least 40% by weight of the total of the condensed liquids are reintroduced directly into the bed of polymer particles above the reactor grid. Said liquid reintroduction is preferably made at a location which is less than $0.5 \times H_c$, for example less than $0.4 \times H_c$, or even less than $0.1 \times H_c$; also, said liquid can be reintroduced into the reactor at a height of more than $0.01 \times H_c$. The combination of this liquid reintroduction above the grid together with recycling of the solids fines provides additional advantages in term of overall stability of operation of the polymerisation reactor.

The polymerisation process of the present invention is preferably a process for the polymerisation of ethylene or propylene (or a combination), preferably for the polymerisation of ethylene.

Two or more polymerisable olefins may be present, in which case the olefin present in the highest amount by weight can generally be referred to as the principal olefin or monomer, and any other polymerisable olefins can be referred to as comonomers.

Thus the comonomers, when present, may be any olefin other than the principal olefin, typically having up to 10 carbon atoms. For avoidance of doubt, ethylene may be a comonomer when propylene is the principal olefin and propylene may be a comonomer when ethylene is the principal olefin. Preferably, the one or more comonomers are selected from 1-olefins having 4 to 10 carbon atoms, such as 1-butene, 1-hexene and 1-octene. Usually, only a single comonomer is deliberately added to the process, although smaller amounts of other olefins may be formed as impurities e.g. via ethylene di- and trimerisation.

Most preferably, the principal olefin is ethylene, which is polymerised with a single 1-olefin comonomer selected from 1-butene, 1-hexene and 1-octene.

Any suitable catalyst may be used in the process of the present invention. Examples of suitable catalysts include chromium-type (or "Phillips") catalysts, Ziegler-type catalysts, late transition metal catalysts and metallocene-type catalysts.

The present invention is particularly applicable to single site metallocene-type catalysts and Ziegler catalysts.

With respect to single site metallocene catalysts, these have a relatively high activity and ability to incorporate "heavier" co-monomers into the polyolefin formed (by which is meant comonomers having a larger molecular weight than the principal olefin) meaning that relatively low concentrations of such comonomers are required in the gas phase to give the desired comonomer content in the resultant polymer.

BRIEF DESCRIPTION OF THE DRAWING

The present invention may be exemplified by the drawing which shows a fluidised bed polymerisation apparatus according to the present invention.

FIG. 1 shows a fluidised bed polymerisation apparatus according to the present invention.

DETAILED DESCRIPTION OF THE INVENTION

With respect to the drawing, there is shown an apparatus comprising a vertically orientated reaction zone comprising a vertically orientated cylindrical section (1) with a fluidisation grid (2) defining its base, and with a disengagement zone (3), being an area of expanded cross-section compared to the cylindrical section, connected to the top of the cylindrical; section. Said cylindrical section (1) has a height $H_c$ from the fluidisation and to the top of the cylindrical section, An outlet (4) for removal of reaction gas from the reaction zone is provided at the top of the disengagement zone (3).

The apparatus also comprises a cyclone (5) provided with an inlet (6) fluidly connected to the outlet (4) for removal of the reaction gas from the reaction zone via pipework (7). As shown, the inlet of the cyclone (6)(solids separation unit) is located at a vertical height lower than the outlet (4) for removal of reaction gas from the reaction zone, and the pipework comprises three sections:—
  (i) a short length of vertically orientated pipe immediately at the outlet (4),
  (ii) a length of downwardly orientated pipe, and
  (iii) a length of horizontal pipe at the inlet (6) of the cyclone (5).

The majority of the length of the pipework comprises the length of downwardly orientated pipe. It should be noted that although the joins are shown as "sharp" in the drawing, in practice these would usually comprise smooth curved sections or elbows.

Also shown in the drawing is a dotted line which represents a nominal straight line drawn between the inlet of the cyclone (6) and the outlet (4) tor removal of reaction gas from the re action zone. This makes an angle to the horizontal with an overall downwards direction compared to the horizontal in the direction from the outlet (4) for removal of reaction gas from the reaction zone to the net (6) of the cyclone.

Further shown in the drawing is a gas removal line (8), by which reaction gas freed of entrained solids is passed to a cooling stage (9), and from which is recovered a cooled recycle stream which is passed via line (10) and compressor (11) and back to the reaction zone. It will be apparent to the person skilled in the art that variations on this configuration are possible. For example, it is possible to compress the gas removed from the reactor prior to cooling.

The separated solids are recovered from the cyclone (5) via line (12) and subsequently to an inlet (13) for introduction of recycled solids into the lower half of the reaction zone (1). A fraction of cooled recycle gas in the process is passed via compressor (14) and used as a motive gas to assist in this introduction.

The invention claimed is:

1. An apparatus for the gas phase polymerisation of olefins, said apparatus comprising:
    a) a reaction zone comprising a grid at its base,
    b) an inlet located in the lower half of the reaction zone for introduction of a reaction gas to the reaction zone,
    c) an outlet located in the upper half of the reaction zone for removal of the reaction gas from the reaction zone, and
    d) a solids separation unit having an inlet fluidly connected to the outlet for removal of the reaction gas from the reaction zone,
    wherein
    the inlet of the solids separation unit is located at a vertical height lower than the outlet for removal of reaction gas from the reaction zone and such that the angle to the horizontal of a straight line drawn between the inlet of the solids separation unit and the outlet for removal of reaction gas from the reaction zone is greater than 20°, and
    wherein the reaction zone comprises an inlet for introduction of recycled solids to the reaction zone which is fluidly connected to a solids outlet of the solids separation unit.

2. An apparatus according to claim 1 wherein the inlet of the solids separation unit is located relative to the outlet for removal of reaction gas from the reaction zone such that the angle to the horizontal of a straight line drawn between the two is greater than 30°.

3. An apparatus according to claim 1 wherein the outlet for removal of reaction gas from the reaction zone and the inlet of the solids separation unit are connected by pipework and the length of any horizontal sections of the pipework constitutes less than 50% of the total length of pipework between the outlet for removal of reaction gas from the reaction zone and the inlet of the solids separation unit.

4. An apparatus according to claim 1 wherein the outlet for removal of reaction gas from the reaction zone and the inlet of the solids separation unit are connected by pipework and at least 50% of the total length of pipework comprises sections which provide flow in a downward direction.

5. An apparatus according to claim 1 wherein the vertical separation of the inlet of the solids separation unit from the inlet for introduction of reaction gas into the reaction zone is less than the vertical separation of the inlet of the solids separation unit from the outlet for removal of reaction gas from the reaction zone.

6. An apparatus according to claim 1 wherein the inlet for introduction of recycled solids to the reaction zone is located in the lower half of the reaction zone.

7. An apparatus according to claim 1 wherein the apparatus is for the gas phase fluidised bed polymerisation of olefins and the reaction zone is a vertically orientated reaction zone comprising:
- a vertically orientated cylindrical section with a fluidisation grid at its base, and with a height $H_c$ as measured from the fluidisation grid to the top of the cylindrical section, and
- a section of expanded cross-section which acts as a disengagement zone above the vertically orientated cylindrical section.

8. An apparatus according to claim 1 wherein the solids separation unit is a cyclone.

9. An apparatus according to claim 1 wherein the reaction zone and the solids separation unit are supported by independent support structures.

10. An apparatus for the gas phase polymerisation of olefins, said apparatus comprising:
- a) a reaction zone comprising a grid at its base,
- b) an inlet located in the lower half of the reaction zone for introduction of a reaction gas to the reaction zone,
- c) an outlet located in the upper half of the reaction zone for removal of the reaction gas from the reaction zone, and
- d) a solids separation unit having an inlet fluidly connected to the outlet for removal of the reaction gas from the reaction zone, wherein the reaction zone comprises an inlet for introduction of recycled solids to the reaction zone which is fluidly connected to a solids outlet of the solids separation unit, and wherein the reaction zone and the solids separation unit are supported by independent support structures.

11. A process for the gas phase polymerisation of olefins using an apparatus according to claim 1, said process comprising:
- a) providing a bed of polymer particles in the reaction zone,
- b) passing a reaction gas into the reaction zone through the inlet for introduction of said gas to the reaction zone,
- c) removing reaction gas from the reaction zone via the outlet for removal of said gas from the reaction zone, and
- d) passing the removed reaction gas to the solids separation unit.

12. A process according to claim 11 wherein the process is a fluidized bed polymerisation process.

13. A process according to claim 11 wherein the polymerization process is a process for the polymerisation of ethylene and/or propylene.

14. A process according to claim 11 wherein a comonomer selected from 1-butene, 1-hexene and 1-octene is used.

15. A process for the gas phase polymerisation of olefins using an apparatus according to claim 10, said process comprising:
- a) providing a bed of polymer particles in the reaction zone,
- b) passing a reaction gas into the reaction zone through the inlet for introduction of said gas to the reaction zone,
- c) removing reaction gas from the reaction zone via the outlet for removal of said gas from the reaction zone, and
- d) passing the removed reaction gas to the solids separation unit.

16. A process according to claim 15 wherein the process is a fluidised bed polymerisation process.

17. A process according to claim 15 wherein the polymerization process is a process for the polymerisation of ethylene and/or propylene.

18. A process according to claim 15 wherein a comonomer selected from 1-butene, 1-hexene and 1-octene is used.

19. An apparatus according to claim 1 wherein the inlet of the solids separation unit is located relative to the outlet for removal of reaction gas from the reaction zone such that the angle to the horizontal of a straight line drawn between the two is greater than 45°.

20. An apparatus according to claim 7 wherein the inlet of the solids separation unit is located at a height which is below the designed maximum height of the bed in the reaction zone.

* * * * *